United States Patent
Biondi et al.

(10) Patent No.: US 6,213,281 B1
(45) Date of Patent: Apr. 10, 2001

(54) METHOD AND UNIT FOR COMBINED TRANSFER-TURNOVER OF PACKETS OF CIGARETTES

(75) Inventors: Andrea Biondi, Bologna; Fiorenzo Draghetti, Medicina, both of (IT)

(73) Assignee: G.D Societa' per Aziona, Bologna (IT)

( * ) Notice: Subject to any disclaimer, the term of this patent is extended or adjusted under 35 U.S.C. 154(b) by 0 days.

(21) Appl. No.: 09/127,264

(22) Filed: Jul. 31, 1998

(30) Foreign Application Priority Data

Aug. 1, 1997 (IT) .............................. B097A0476

(51) Int. Cl.[7] .............................. B65G 47/244
(52) U.S. Cl. .............................. 198/407; 198/408
(58) Field of Search .............................. 198/407, 408, 198/471.1, 803.5

(56) References Cited

U.S. PATENT DOCUMENTS

| | | | |
|---|---|---|---|
| 3,894,626 | 7/1975 | Neumann | 198/25 |
| 4,560,060 | * 12/1985 | Lenhart | 198/803.5 |
| 4,883,163 | 11/1989 | Gamberini et al. | 198/460 |
| 5,025,910 | 6/1991 | Lasure et al. | 198/377 |
| 5,730,048 | * 3/1998 | Averill et al. | 101/37 |

FOREIGN PATENT DOCUMENTS

| 2324546 | 4/1977 | (FR) . |
|---|---|---|
| 59-163221 | 9/1984 | (JP) . |

OTHER PUBLICATIONS

Patent Abstracts of Japan of JP 59–163221 of Sep. 1984.
"Vacuum Conveyor Sucks Up Cartons" *Machine Designs*, vol. 46, No. 2, Jan. 24, 1974.

* cited by examiner

*Primary Examiner*—Christopher P. Ellis
*Assistant Examiner*—Mark A. Deuble
(74) *Attorney, Agent, or Firm*—Ladas and Parry

(57) ABSTRACT

A method and unit for combined transfer-turnover of packets of cigarettes, whereby the packets are fed successively by a first conveyor in a first direction perpendicular to a front first face of each packet and along a portion of a path extending through a transfer station, to which each packet is supplied in time with a respective suction seat carried by a second conveyor, which engages the first face of the packet by suction, and removes the packet from the transfer station in a second direction parallel to the first face.

4 Claims, 2 Drawing Sheets

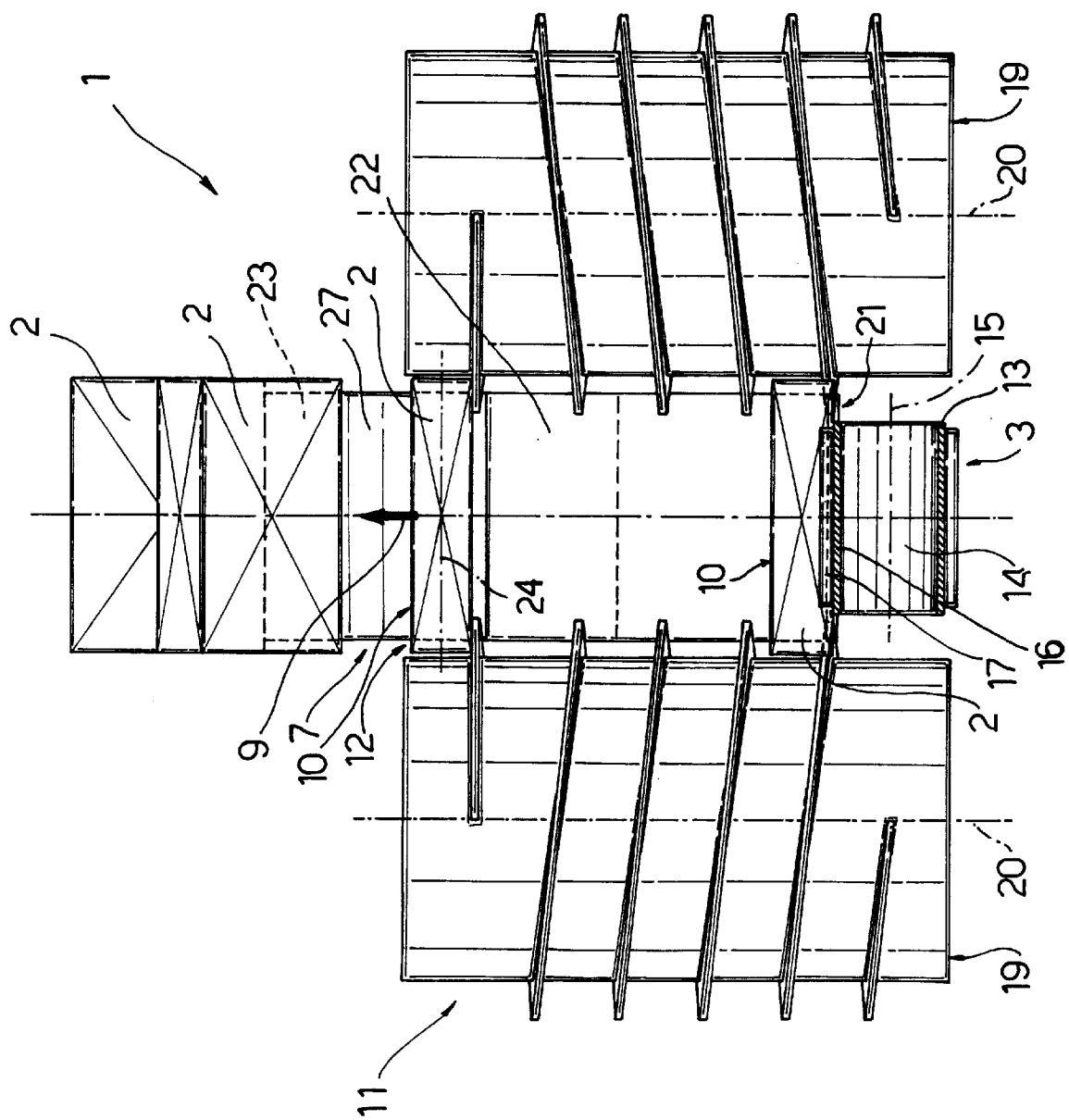

METHOD AND UNIT FOR COMBINED TRANSFER-TURNOVER OF PACKETS OF CIGARETTES

BACKGROUND OF THE INVENTION

The present invention relates to a method for combined transfer-turnover of packets of cigarettes.

In cigarette manufacturing and conditioning systems, finished cellophaned packets, i.e. enclosed in an outer wrapping impermeable to air, are fed successively by a conveyor in a first direction with a first given orientation, and are then turned over to assume a second orientation normally rotated 90° with respect to the first.

The packets are normally turned over by means of a turnover wheel rotating about a respective axis perpendicular to said first direction, and having a number of substantially radial arms, which move past the output end of the conveyor to receive respective packets and feed them forward with a second orientation rotated 90° with respect to the first.

As they are turned over, the packets must of course be guided by outer guide elements, along which a whole face of each packet slides.

Due to the increasingly high output speed at which modern systems are operated, the sliding movement of the packets may result in scoring of the outer wrapping, which, being made of increasingly thinner sheet material for environmental reasons, is normally less resistant to external stress than formerly.

U.S. Pat. No. 3,894,626 and the description entitled "Vacuum Conveyor Sucks Up Cartons" (MACHINE DESIGN—vol. 46, no. 2, Jan. 24, 1974. pages 40–40, XP002067430), show a conveying device for combined transfer-turnover of products, wherein the products are fed successively by a first conveyor in a first direction perpendicular to a front face of each product and along a portion of a path extending through a transfer station, at which each packet is engaged, at its front face, by a second suction conveyor removing the product from the transfer station in a second direction parallel to the noted front face.

The aforementioned second suction conveyor comprises a porous conveying surface movable over and along a vacuum chamber having a plurality of holes; and air drawn through the porous conveying surface by the vacuum chamber holds the front faces of the products in contact with the conveying surface of the second suction conveyor.

Since only a relatively small part of the aforementioned porous conveying surface is engaged by the front faces of the products, and a relatively great quantity of air is sucked into the suction chamber through the remaining part of the porous conveying surface, the vacuum within the suction chamber is, in general, relatively weak as is the suction force through the porous conveying surface.

The known devices described above cannot be used for conveying products which are to be conveyed at a relatively high speed, such as cigarette packets in a modern cigarette packer normally operating at a rate of 600 packets/minute, owing to the fact that high transport speeds involve high centrifugal and inertial forces which cannot be contrasted by a weak vacuum.

SUMMARY OF THE INVENTION

It is an object of the present invention to provide a method for combined transfer-turnover of packets of cigarettes, designed to overcome the aforementioned drawbacks.

According to the present invention there is provided a method for combined transfer-turnover of packets of cigarettes, the method comprising the steps of successively feeding a packet, with a first face forwards, in a first direction perpendicular to said first face and by means of first conveying means, along a portion of a path extending through a transfer station; and engaging said packet, by means of second conveying means and at the transfer station, to remove the packet from the transfer station in a second direction parallel to said first face; the method being characterized in that said packet is engaged at said transfer station by a suction seat mobile with the second conveying means through said transfer station in time with supply of said packet to the transfer station; said packet being engaged by said suction seat at said front face, and being fed along said path by moving said suction seat with said second conveying means.

The present invention also relates to a unit for combined transfer-turnover of packets of cigarettes.

According to the present invention, there is provided a unit for combined transfer-turnover of packets of cigarettes, the unit comprising first conveying means for successively feeding packets in a first direction along a portion of a path, and each with a respective first face forwards and perpendicular to said first direction; a transfer station located along said path and downstream from said first conveying means; and second suction conveying means for engaging each packet at the transfer station to remove the packet from the transfer station in a second direction parallel to said first face; the unit being characterized in that said second conveying means comprise a succession of suction seats, each for engaging a said first face of a respective said packet by suction, and each mobile with said second conveying means to feed the respective packet along said path in said second direction and downstream from said transfer station; said second suction conveying means being synchronized with said first conveying means for feeding each suction seat through said transfer station in time with supply of a relevant said packet to the transfer station.

BRIEF DESCRIPTION OF THE DRAWINGS

The present invention will now be described by way of example with reference to the accompanying drawings, in which:

FIG. 2 shows a schematic front view, with parts in section and parts removed for clarity, of the FIG. 1 unit.

DETAILED DESCRIPTION OF THE INVENTION

Figure 1:
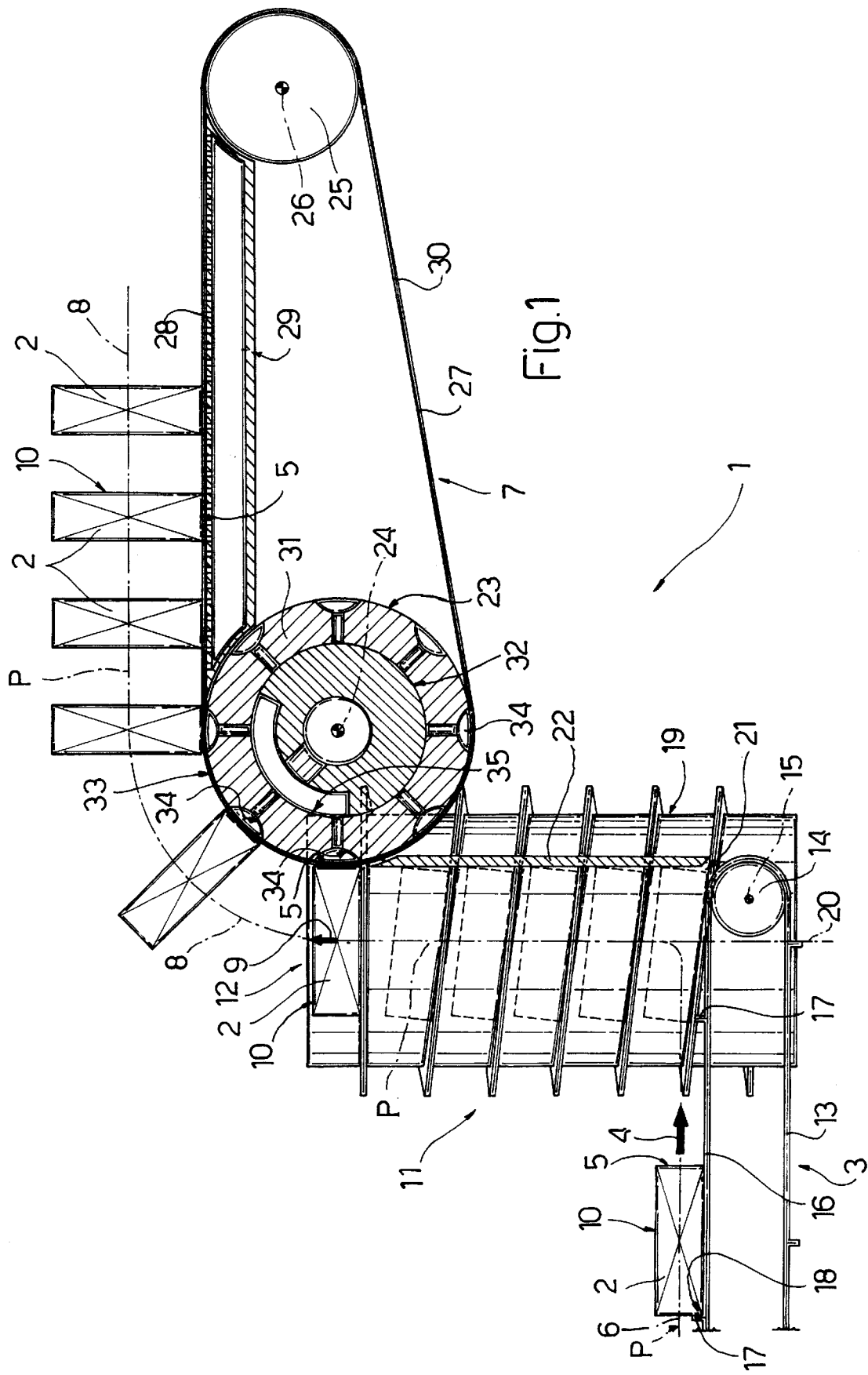
FIG. 1 shows a schematic side view, with parts in section and parts removed for clarity, of a preferred embodiment of the unit according to the present invention.

Numeral 1 in the accompanying drawings indicates as a whole a unit for combined transfer-turnover of cellophaned packets 2 of cigarettes, i.e. enclosed in respective sheets (not shown) of wrapping material impermeable to air.

Unit 1 comprises an input conveyor 3 for successively feeding packets 2, each with a small face 5 forwards in a substantially horizontal first direction 4 along an input portion 6 of a path P; a substantially horizontal output conveyor 7 for successively feeding packets 2 along an output portion 8 of path P and in a second direction 9 parallel to face 5 and perpendicular to a large lateral face 10 of packets 2; and an accelerating device 11 interposed between an output end of conveyor 3 and a transfer station 12 located along path P at the input of conveyor 7.

Conveyor 3 comprises an endless belt 13 narrower than the width of packets 2 measured crosswise to belt 13, so that two opposite end portions of each packet 2 project outwards of belt 13. Belt 13 is looped about at least two pulleys, only one of which, indicated at 14 and located at the output end of conveyor 3, is shown, and which is rotated clockwise in FIG. 1, by a motor (not shown) and at a surface speed V1, about a respective substantially horizontal axis 15 crosswise to direction 4. Belt 13 comprises a top branch 16 parallel to direction 4; and a number of equally spaced projections 17 defining, along belt 13, respective conveying pockets 18, each for receiving a respective packet 2.

As shown more clearly in FIG. 2, accelerating device 11 comprises two counter-rotating screws 19 located on either side of an output end portion of branch 16 of belt 13, and rotating about respective substantially vertical axes 20 at a surface speed greater than speed V1 to engage said end portions of each packet 2 projecting outwards of belt 13, and to raise packets 2, each with a face 10 forwards, in direction 9 at a traveling speed V2.

The pickup location 21, at which each packet 2 is removed from belt 13 by screws 19, is defined by a plate 22 located between screws 19, parallel to axes 20, and defining a stop element for packets 2 fed by conveyor 3.

The top ends of screws 19 are located at transfer station 12 and substantially tangent to the outer periphery of a suction drum 23 mounted for rotation about an axis 24, parallel to axis 15, at a surface speed substantially equal to speed V2. Drum 23 defines a pulley forming part of output conveyor 7, which also comprises a drive pulley 25 rotating about an axis 26 parallel to axis 24, and a belt 27 looped about drum 23 and pulley 25 and made of material permeable to air. Belt 27 comprises a top conveying branch 28 substantially parallel to branch 16 of conveyor 3, extending between drum 23 and pulley 25, and contacting a suction box 29 interposed between conveying branch 28 and a return branch 30 of belt 27.

As shown in FIG. 1, drum 23 comprises an outer annular element 31, which is fitted idly to a fixed inner air distributor 32 coaxial with axis 24, and in turn comprises, about a respective outer surface 33, a succession of equally spaced suction seats 34, each communicating selectively with a suction chamber 35 formed in distributor 32 and extending about axis 24 along an arc extending between transfer station 12 and the start of conveying branch 28.

In the example shown, as branches 16 and 28 are parallel, suction chamber 35 extends along a substantially 90° arc, but would obviously extend along an arc of a different angle if branches 16 and 28 were not parallel.

The operation of unit 1 will now be described with reference to combined transfer-turnover of one packet 2, and as of an initial condition in which packet 2 is fed by belt 13 at speed V1 along portion 6 of path P, face 5 is perpendicular to traveling direction 4, and packet 2 rests inside respective conveying pocket 18 and is pushed towards pickup location 21 by respective projection 17.

As the end portions of packet 2 projecting from belt 13 begin engaging screws 19, the rotation of screws 19 about axes 20, at a faster surface speed than and in the same direction as speed V1, detaches packet 2 from respective projection 17 in direction 4, and simultaneously lifts packet 2 into contact with plate 22, which eliminates the component of motion of packet 2 in direction 4.

As stated, packet 2 reaches station 12 at speed V2, which—depending on whether screws 19 have constant-pitch threads, as in the example shown, or variable-pitch threads, as in a variation not shown—is maintained constantly by packet 2 all the way up, or is only reached at station 12.

Conveyor 7 is driven by drive pulley 25 at speed V2 and in time with screws 19, i.e. so that each seat 34 travels through station 12 simultaneously with a respective packet 2. Consequently, on arriving at station 12, packet 2 is engaged at face 5 by respective suction seat 34 and is connected to conveyor 7, which feeds it in direction 9 with face 10 frontwards, i.e. with a final orientation rotated 90° with respect to the original orientation of packet 2 on conveyor 3, with no need for any outer guidance or support. The final orientation and the position assumed by packet 2 on conveyor 7 are maintained, downstream from drum 23, by the suction produced through belt 27 by suction box 29.

What is claimed is:

1. A unit for combined transfer-turnover of packets of cigarettes, the unit comprising first conveying means (3) for successively feeding packets (2) in a first direction (4) along a portion (6) of a path (P), and each with a respective first face (5) facing forwards and perpendicular to said first direction (4); a transfer station (12) located along said path (P) and downstream from said first conveying means (3); and second suction conveying means (7) for engaging each packet (2) at the transfer station (12) to remove the packet (2) from the transfer station (12) in a second direction (9) parallel to said first face (5); said second conveying means (7) comprising a succession of suction seats (34), each seat (34) engaging a said first face (5) of a respective said packet (2) by suction and being mobile with said second conveying means (7) to feed the respective packet (2) along said path (P) in said second direction (9) and downstream from said transfer station (12); said second suction conveying means (7) being synchronized with said first conveying means (3) for feeding each suction seat (34) through said transfer station (12) in time with supply of a respective said packet (2) to the transfer station (12); said second conveying means (7) further comprising a belt conveyor (7) in turn comprising an endless belt (27) and two pulleys (23, 25) supporting said belt (27) and mounted for rotation about respective axes (24, 26) crosswise with respect to said first direction (4); said belt (27) being permeable to air; one of said pulleys (23) being tangent to said path (P) at said transfer station (1 2), and including a suction drum (23); said suction seats (34) being equally spaced along an outer periphery (33) of said suction drum (23); said belt (27) having a conveying branch (28) extending between said two pulleys (23, 25); and further suction means (29) being provided along said conveying branch (28) to retain said packets (2) on the conveying branch (28); said conveying branch (28) being substantially parallel to said first direction (4), said first and second conveying means (3, 7) conveying said packets (2) at a first and second speed (V1, V2) respectively; accelerating means (11) being provided to accelerate each said packet (2) in said second direction (9) so that the packet assumes substantially said second speed (V2) immediately upstream from said transfer station (12), said accelerating means (11) comprising two counter-rotating screws (19) with respective axes parallel to said second direction (9); said two screws (19) being activated to receive said packets (2) from said first conveying means (3), to feed said packets (2) in said second direction (9), and to feed the packets (2) to the transfer station (12) in time with said suction seats (34).

2. A unit as claimed in claim 1, wherein said suction drum comprises an outer annular idler member (31) provided with said seats (34) distributed uniformly around the periphery thereof, and a fixed suction chamber (35) disposed within said annular member and extending over an arc extending from said transfer station to said conveying branch of said belt, said suction chamber (35) being in communication with said seats when said seats pass through said arc to apply suction to the seats in said arc.

3. A unit as claimed in claim 1, comprising stop means (22) for eliminating a component of motion of each packet (2) in said first direction (4) upstream from said transfer station (12).

4. A unit as claimed in claim 1, comprising a fixed suction chamber (35) within said suction drum and extending around a portion of the suction drum extending between said transfer station and said conveying branch, said suction chamber (35) being in communication with said seats (34) as said seats travel from said transfer station to said conveying branch.

* * * * *

UNITED STATES PATENT AND TRADEMARK OFFICE
CERTIFICATE OF CORRECTION

PATENT NO.    : 6,213,281 B1
DATED         : April 10, 2001
INVENTOR(S)   : Andrea Biondi, Fiorenzo Draghetti It is certified that error appears in the above-identified patent and that said Letters Patent is hereby corrected as shown below:

<u>Title page,</u>
Item [73] Assignee, "Aziona" should read -- Azioni --

Signed and Sealed this

Fifth Day of March, 2002

Attest:

JAMES E. ROGAN
*Attesting Officer*     *Director of the United States Patent and Trademark Office*